United States Patent
Wu (10) Patent No.: US 7,314,301 B2
(45) Date of Patent: Jan. 1, 2008

(54) LIGHT-EMITTING DEVICE AND BACK LIGHT UNIT WITH LIGHT EMITTING DIODES

(75) Inventor: Fung-Hsu Wu, Tao-Yuan Hsien (TW)

(73) Assignee: Daxon Technology Inc., Gueishan, Tao-Yuan Hsien (TW)

( * ) Notice: Subject to any disclaimer, the term of this patent is extended or adjusted under 35 U.S.C. 154(b) by 0 days.

(21) Appl. No.: 11/277,232

(22) Filed: Mar. 23, 2006

(65) Prior Publication Data

US 2007/0153546 A1     Jul. 5, 2007

(30) Foreign Application Priority Data

Jan. 3, 2006    (TW) ............... 95100232 A (51) Int. Cl.
*F21V 7/04* (2006.01)
(52) U.S. Cl. ............... 362/621; 362/606; 362/612; 362/628
(58) Field of Classification Search ............ 362/612, 362/606, 621, 628, 615, 608, 610, 29, 30, 362/330; 313/500
See application file for complete search history.

(56) References Cited

U.S. PATENT DOCUMENTS

| | | | |
|---|---|---|---|
| 4,714,983 A * | 12/1987 | Lang ............... 362/27 |
| 5,887,964 A | 3/1999 | Higuchi et al. | |
| 6,130,730 A * | 10/2000 | Jannson et al. ............... 349/65 |
| 6,402,335 B1 | 6/2002 | Kalantar et al. | |
| 6,474,826 B1 | 11/2002 | Tanaka et al. | |
| 6,568,822 B2 * | 5/2003 | Boyd et al. ............... 362/621 |
| 6,612,722 B2 | 9/2003 | Ryu et al. | |
| 6,626,550 B2 | 9/2003 | Choi | |
| 7,101,070 B2 * | 9/2006 | Yu et al. ............... 362/558 |
| 7,121,692 B2 * | 10/2006 | Yu et al. ............... 362/330 |
| 7,139,048 B2 * | 11/2006 | Han et al. ............... 349/62 |
| 2002/0181222 A1 * | 12/2002 | Boyd et al. ............... 362/31 |
| 2004/0207775 A1 * | 10/2004 | Min et al. ............... 349/65 |
| 2004/0246601 A1 * | 12/2004 | Okuwaki et al. ............ 359/834 |
| 2005/0190578 A1 * | 9/2005 | Miyashita ............... 362/615 |
| 2006/0104091 A1 * | 5/2006 | Chen et al. ............... 362/621 |

\* cited by examiner

*Primary Examiner*—Sandra O'Shea
*Assistant Examiner*—Evan Dzierzynski
(74) *Attorney, Agent, or Firm*—Winston Hsu (57) ABSTRACT

Light emitting diodes are arranged in a matrix under an incident surface of a light guide panel. The incident surface includes a plurality of incident blocks arranged with each incident block respectively positioned beside a corresponding LED. Each incident block includes a plurality of surfaces having different normal vectors or curvature radiuses for scattering light emitted from the corresponding LED. A reflection film may be used to reflect light generated from the plurality of LEDs and a diffuser sheet may be positioned at one side of a light-exit surface of the light guide panel.

9 Claims, 13 Drawing Sheets

LIGHT-EMITTING DEVICE AND BACK LIGHT UNIT WITH LIGHT EMITTING DIODES

BACKGROUND OF THE INVENTION

1. Field of the Invention

The present invention relates to a light-emitting device and back light unit, and more particularly, to a light-emitting device and back light unit with an incident surface having a plurality of surfaces with different normal vectors for scattering light emitted from a corresponding LED.

2. Description of the Prior Art

Commonly seen back light units are divided into direct back light units and edge back light units. Among them, the direct back light units site the light source under the LCD panel for providing a brighter light source. Therefore, the direct back light units are popularly used in large sized LCD panels such as LCD monitors and LCD TVs.

In general, the light sources of back light units are cold cathode fluorescent lamps or light emitting diodes. Cold cathode fluorescent lamps are capable of providing a large size light source. The drawbacks of a cold cathode fluorescent lamp are that it generates heat, shortens the lifetime of components, and causes mercury pollution. At the same time, the advantages of an LED are that it has a long lifetime, small size, high color saturation, consumes low power, and causes no pollution. Hence, there is a future tendency that LEDs substitute for CCFLs.

Figure 1:
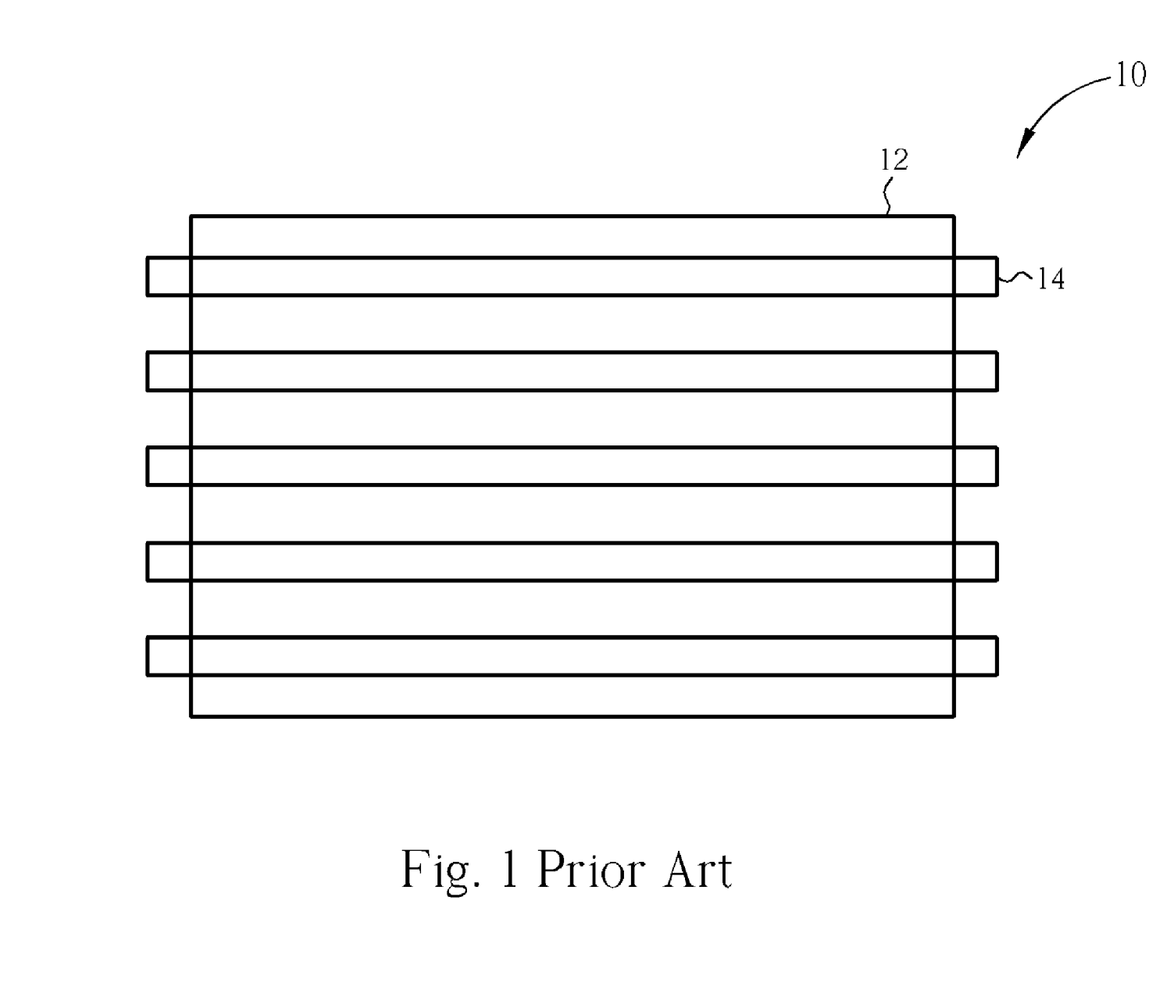
FIG. 1 is a top-view drawing of a back light unit according to the prior art.

Please refer to FIG. 1. FIG. 1 is a top-view drawing of a back light unit 10 according to the prior art. The light source of the back light unit 10 is from a plurality of cold cathode fluorescent lamps 14 positioned under a light guide panel 12. The plurality of cold cathode fluorescent lamps 14 is used for generating light and the light guide panel 12 is used for evenly mixing the light delivered from the plurality of cold cathode fluorescent lamps 14. The light guide panel 12 is an injection-molded slab that is pervious to light and comprises plastic and glass materials.

Figure 2:
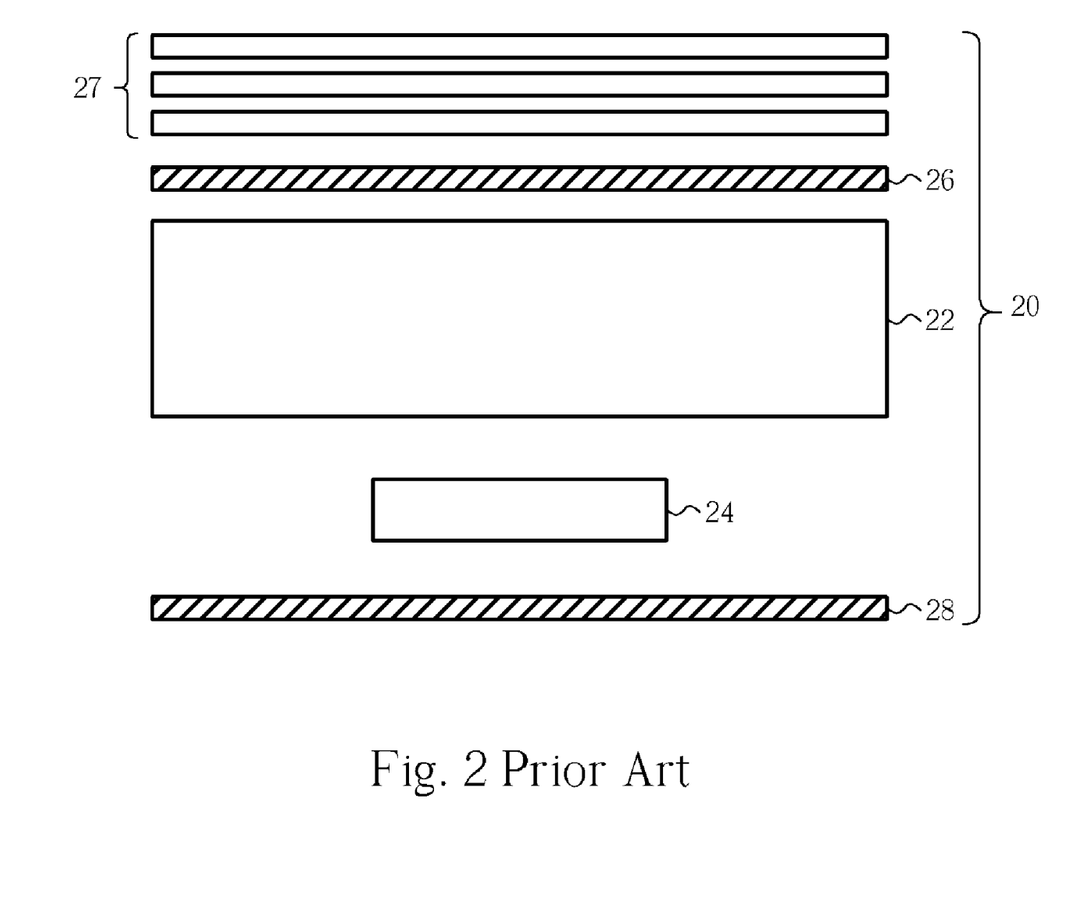
FIG. 2 is a diagram of another back light unit according to the prior art.

Please refer to FIG. 2, which is a diagram of another back light unit 20 according to the prior art. The light source of the back light unit 20 is from a plurality of LEDs 24 (only one LED 24 is shown in FIG. 2 as an example) positioned under a light guide panel 22. The plurality of LEDs 24 is used for generating light and the light guide panel 22 is used for evenly mixing the light delivered from the plurality of LEDs 24. The light guide panel 22 is an injection-molded slab that is pervious to light and comprises plastic and glass materials. The back light unit 20 includes a diffuser sheet 26 with one side positioned at the light guide panel 22 and a reflection film 28 positioned at one side of the LED 24. The diffuser sheet 26 is used to diffuse light passing through the light guide panel and the reflection film 28 is used to reflect light generated from the LED 24. The back light unit 20 further includes a plurality of optical films 27 positioned at another side of the diffuser sheet 26. The plurality of optical films 27 at least includes an optical film selected from a group consisting of a prism sheet, a diffuser plate, a brightness enhancement film, and a ¼-wavelength sheet. The quantities and the types of the plurality of optical films 27 depend on a user's demand or design.

The cold cathode fluorescent lamps 14 are popularly used in large sized LCD panels due to the fact that they can provide a large size light source. But the cold cathode fluorescent lamps 14 generate heat, shorten the lifetime of components, and cause mercury pollution when discharging. On the other hand, although the back light unit 20 utilizing the LEDs 24 as the light source can solve the above problems, the emitting area of the LEDs 24 is too small. For this reason, the structure of the light guide panel 22 needs a special design for enlarging the emitting area of the LEDs 24.

SUMMARY OF THE INVENTION

The claimed invention provides a light-emitting device. The light-emitting device includes a plurality of light emitting diodes and a light guide panel. The plurality of light emitting diodes is arranged in a matrix manner and used to generate light. The light guide panel includes a light-exit surface and an incident surface. The incident surface includes a plurality of incident blocks arranged in a matrix manner correspondingly positioned beside the plurality of LEDs, and each incident block includes a plurality of surfaces with different normal vectors for scattering light emitted from a corresponding LED.

The claimed invention further provides a light-emitting device. The light-emitting device includes a plurality of light emitting diodes and a light guide panel. The plurality of light emitting diodes is arranged in a matrix manner and used to generate light. The light guide panel includes a light-exit surface and an incident surface. The incident surface includes a plurality of incident blocks arranged in a matrix manner correspondingly positioned beside the plurality of LEDs, and each incident block includes a plurality of curves with different curvature radiuses for scattering light emitted from a corresponding LED.

The claimed invention further provides a back light unit. The back light unit includes a plurality of light emitting diodes, a light guide panel, a reflection film, and a diffuser sheet. The plurality of light emitting diodes is arranged in a matrix manner and used to generate light. The light guide panel includes a light-exit surface and an incident surface. The incident surface includes a plurality of incident blocks arranged in a matrix manner correspondingly positioned beside the plurality of LEDs, and each incident block includes a plurality of surfaces with different normal vectors for scattering light emitted from a corresponding LED. The reflection film is used to reflect light generated from the plurality of LEDs. The diffuser sheet is positioned at one side of the light-exit surface of the light guide panel and used to diffuse light passing through the light guide panel.

The claimed invention further provides a back light unit. The back light unit includes a plurality of light emitting diodes, a light guide panel, a reflection film, and a diffuser sheet. The plurality of light emitting diodes is arranged in a matrix manner and used to generate light. The light guide panel includes a light-exit surface and an incident surface. The incident surface includes a plurality of incident blocks arranged in a matrix manner correspondingly positioned beside the plurality of LEDs, and each incident block includes a plurality of curves with different curvature radiuses for scattering light emitted from a corresponding LED. The reflection film is used to reflect light generated from the plurality of LEDs. The diffuser sheet is positioned at one side of the light-exit surface of the light guide panel and used to diffuse light passing through the light guide panel.

These and other objectives of the present invention will no doubt become obvious to those of ordinary skill in the art after reading the following detailed description of the preferred embodiment that is illustrated in the various figures and drawings.

DETAILED DESCRIPTION

Figure 3:
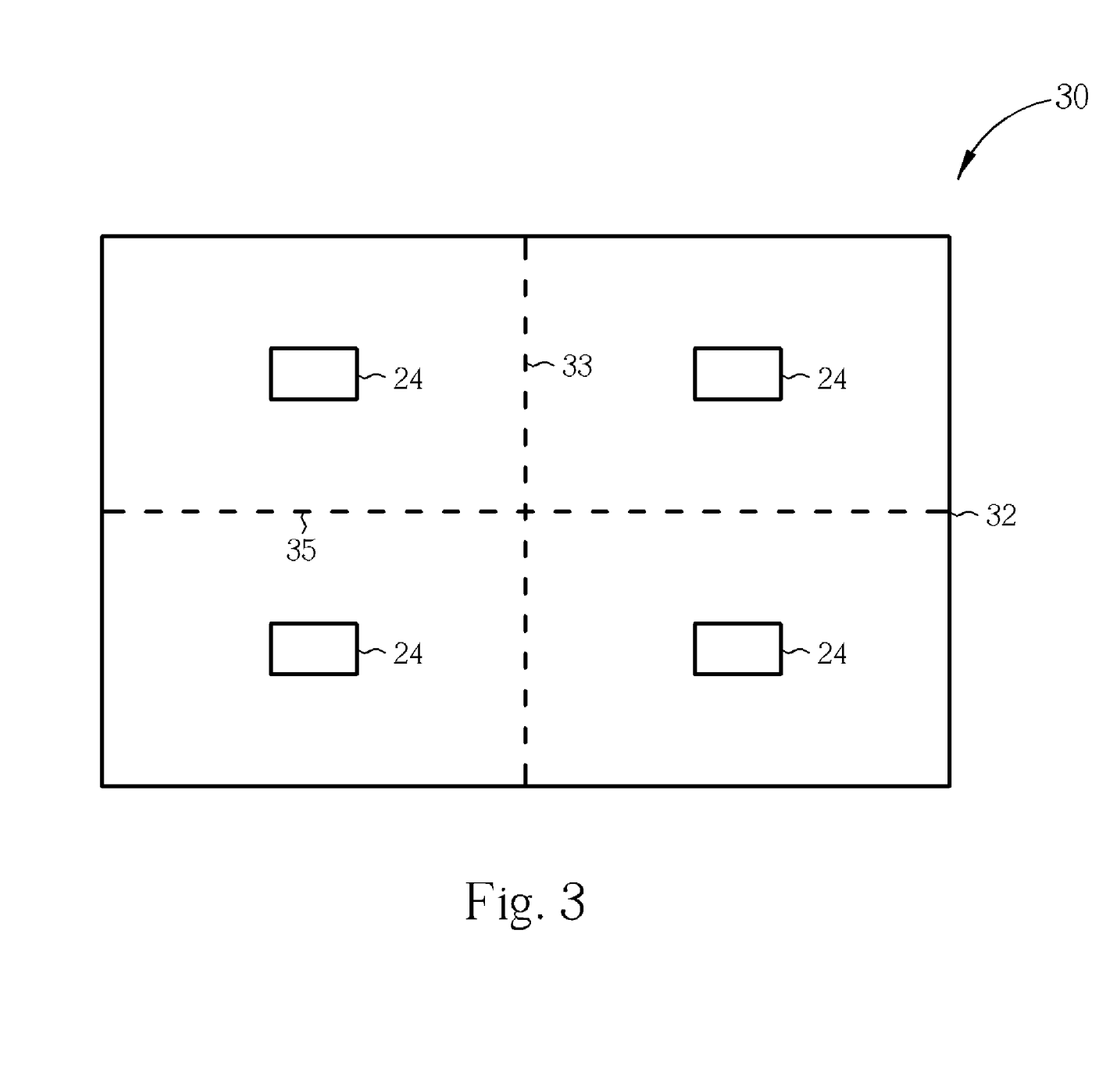
FIG. 3 is a top-view drawing of a back light unit according to the present invention.

Please refer to FIG. 3. FIG. 3 is a top-view drawing of a back light unit 30 according to the present invention. The light source of the back light unit 30 is from a plurality of LEDs 24 arranged in a matrix manner and positioned under a light guide panel 32. The plurality of LEDs 24 is used for generating light and the light guide panel 32 is used for mixing the light delivered from the plurality of LEDs 24. The light guide panel 32 is an injection-molded slab that is pervious to light and comprises plastic and glass materials. Each LED 24 is capable of emitting a larger size light by means of special design of the light guide panel 32. As shown in FIG. 3, two dotted lines 33 and 35 divide the light guide panel 32 into four areas and each area is provided enough light by one LED 24.

Figure 4:
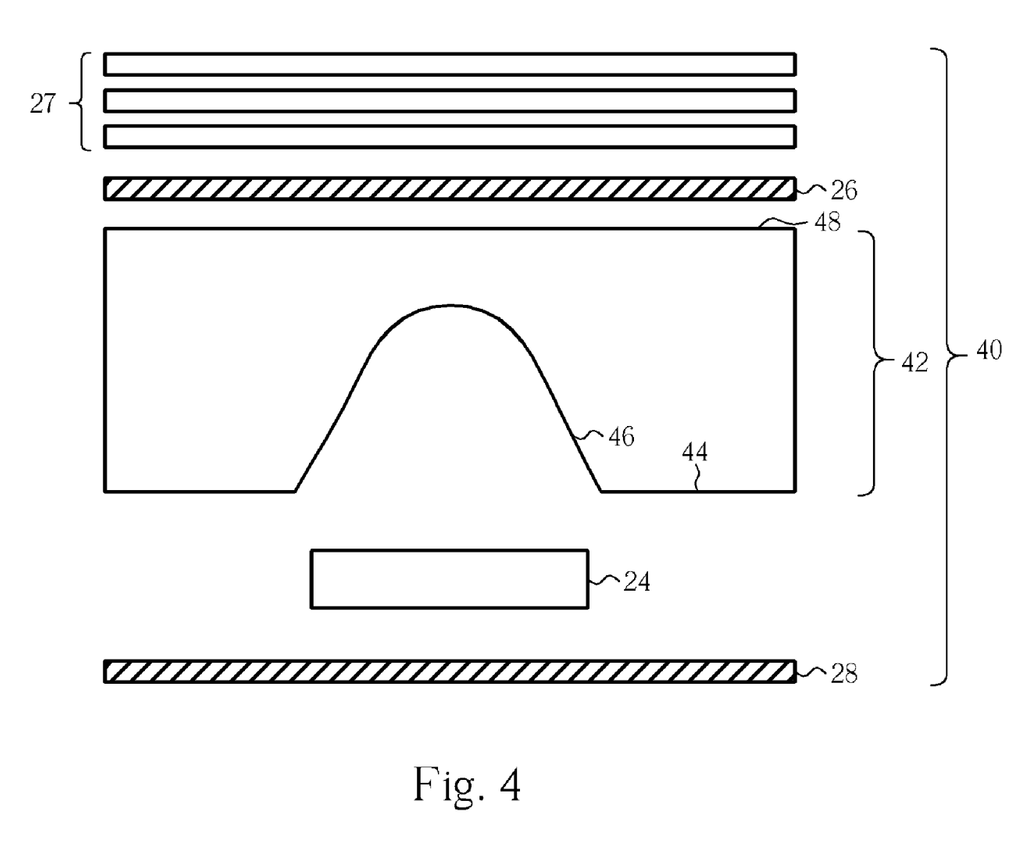
FIG. 4 is a diagram of another back light unit according to the present invention.

Please refer to FIG. 4 that is a diagram of another back light unit 40 according to the present invention. The light source of the back light unit 40 is from a plurality of LEDs 24 (only one LED 24 is shown in FIG. 4 as an example) positioned under a light guide panel 42. The plurality of LEDs 24 is used for generating light and the light guide panel 42 is used for mixing the light delivered from the plurality of LEDs 24. The light guide panel 42 is an injection-molded slab that is pervious to light and comprises plastic and glass materials. The light guide panel 42 includes a light-exit surface 48 and an incident surface 44. The incident surface 44 includes a plurality of incident blocks 46 (only one incident block 46 is shown in FIG. 4 as an example) arranged in a matrix manner correspondingly positioned beside the plurality of LEDs 24. The incident block 46 is a recess comprising a plurality of curves with different curvature radiuses (please refer to FIG. 5) for scattering light emitted from a corresponding LED 24. The back light unit 40 includes a diffuser sheet 26 positioned with one side at the light guide panel 42 and a reflection film 28 positioned at one side of the LEDs 24. The diffuser sheet 26 is used to diffuse light passing through the light guide panel 42 and the reflection film 28 is used to reflect light generated from the LEDs 24. The back light unit 40 further includes a plurality of optical films 27 positioned at another side of the diffuser sheet 26. The plurality of optical films 27 at least includes an optical film selected from a group consisting of a prism sheet, a diffuser plate, a brightness enhancement film, and a ¼-wavelength sheet. The quantities and the types of the plurality of optical films 27 depend on a user's demand or design.

Figure 5:
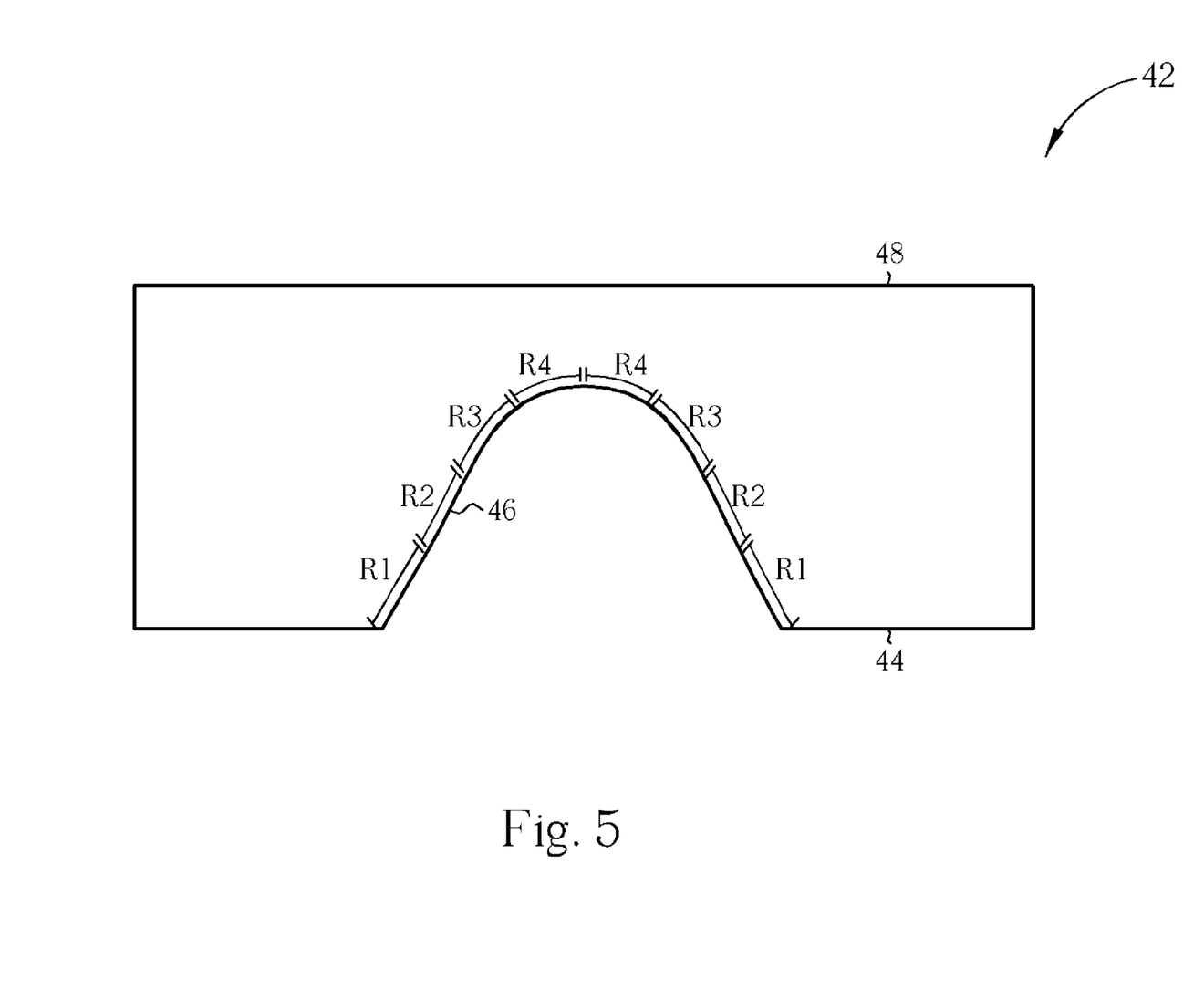
FIG. 5 is a diagram illustrating the light guide panel in FIG. 4.

Please refer to FIG. 5. FIG. 5 is a diagram illustrating the light guide panel 42 in FIG. 4. The light guide panel 42 includes a light-exit surface 48 and an incident surface 44. The incident surface 44 includes a plurality of incident blocks 46 (only one incident block 46 is shown in FIG. 5 as an example). Each incident block 46 is a recess comprising a plurality of curves R1-R4 with different curvature radiuses. The curvature radiuses of the curve R1 is greater than the curvature radiuses of the curve R2, the curvature radiuses of the curve R2 is greater than the curvature radiuses of the curve R3, and the curvature radiuses of the curve R3 is greater than the curvature radiuses of the curve R4. The incident angles of the curves R1-R4 are different due to the curvature radiuses of the curves R1-R4 being different. Therefore, the light guide panel 42 is capable of dispersing and mixing the light emitted from the LED 24.

Figure 6:
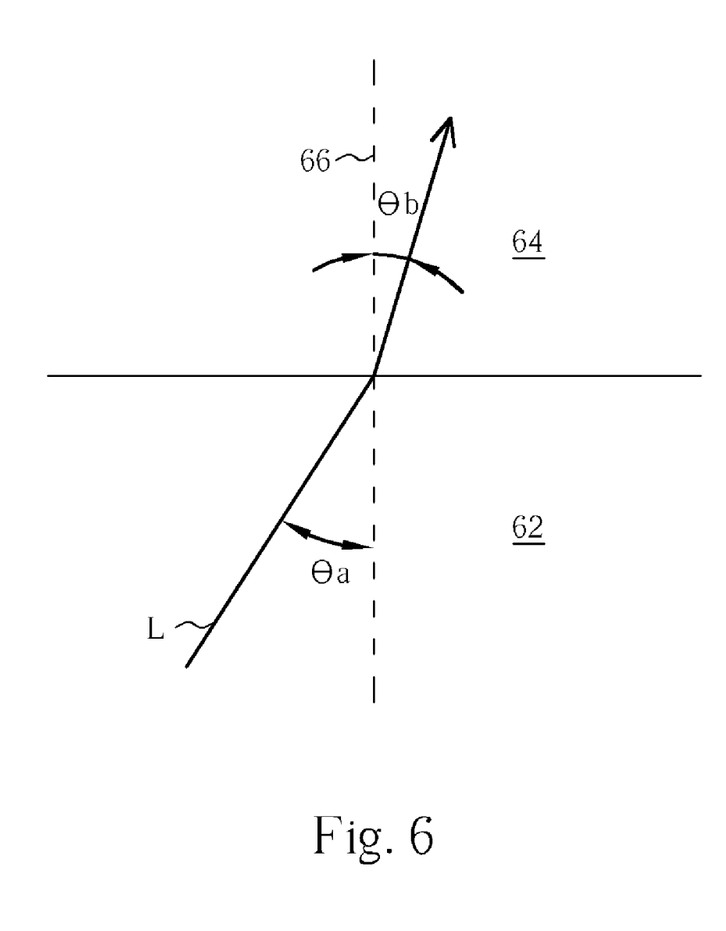
FIG. 6 is a diagram illustrating Snell's Law.

Please refer to FIG. 6, which is a diagram illustrating Snell's Law. There are reflections and refractions occurring when light gets into different media. The incident wave and the refracted wave lie on the same plane. The light L enters a medium 64 from a medium 62. The included angle between the light L and a normal vector 66 of the interface has a relationship: $n_a * \sin \theta_a = n_b * \sin \theta_b$, where $n_a$ and $n_b$ respectively stand for the refractive indexes of the mediums 62 and 64. $\theta_a$ and $\theta_b$ stand for the included angles between the light L and the normal vector 66 in the medium 62 and 64.

Figure 7:
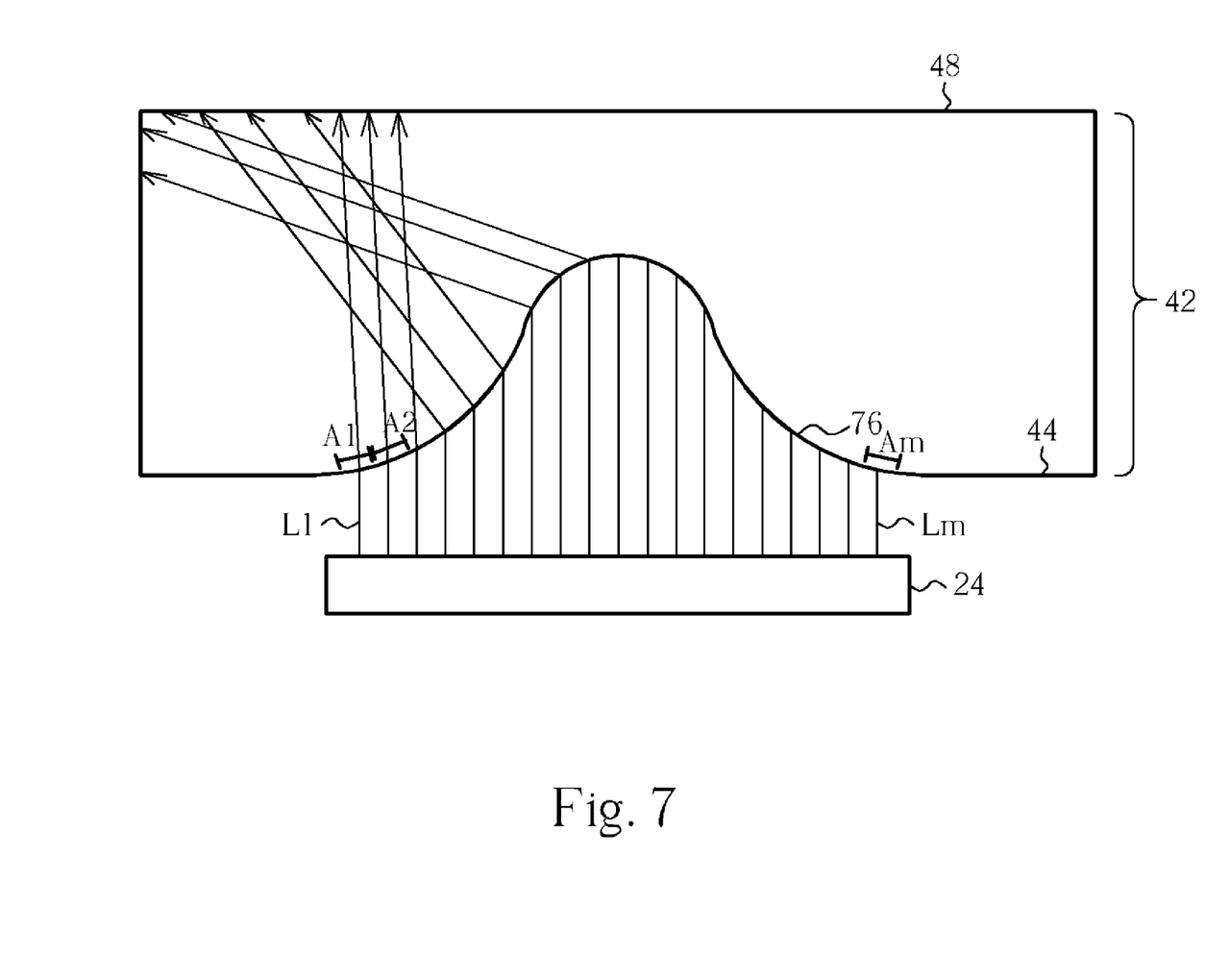
FIG. 7 is a diagram illustrating the moving path of light in the light guide panel of FIG. 4.

Please refer to FIG. 7 that is a diagram illustrating the moving path of light in the light guide panel 42 of FIG. 4. The light guide panel 42 includes a light-exit surface 48 and an incident surface 44. The incident surface 44 includes a plurality of incident blocks 76 (only one incident block 76 is shown in FIG. 7 as an example). Each incident block 76 comprises a plurality of curves A1-Am with different curvature radiuses. The LED 24 radiates a plurality of rays L1-Lm into the incident block 76. The refraction angles of the rays L1-Lm are different due to the incident angles of the rays L1-Lm being different. Therefore, the light guide panel 42 is capable of dispersing and well mixing the light emitted from the LED 24.

Figure 8:
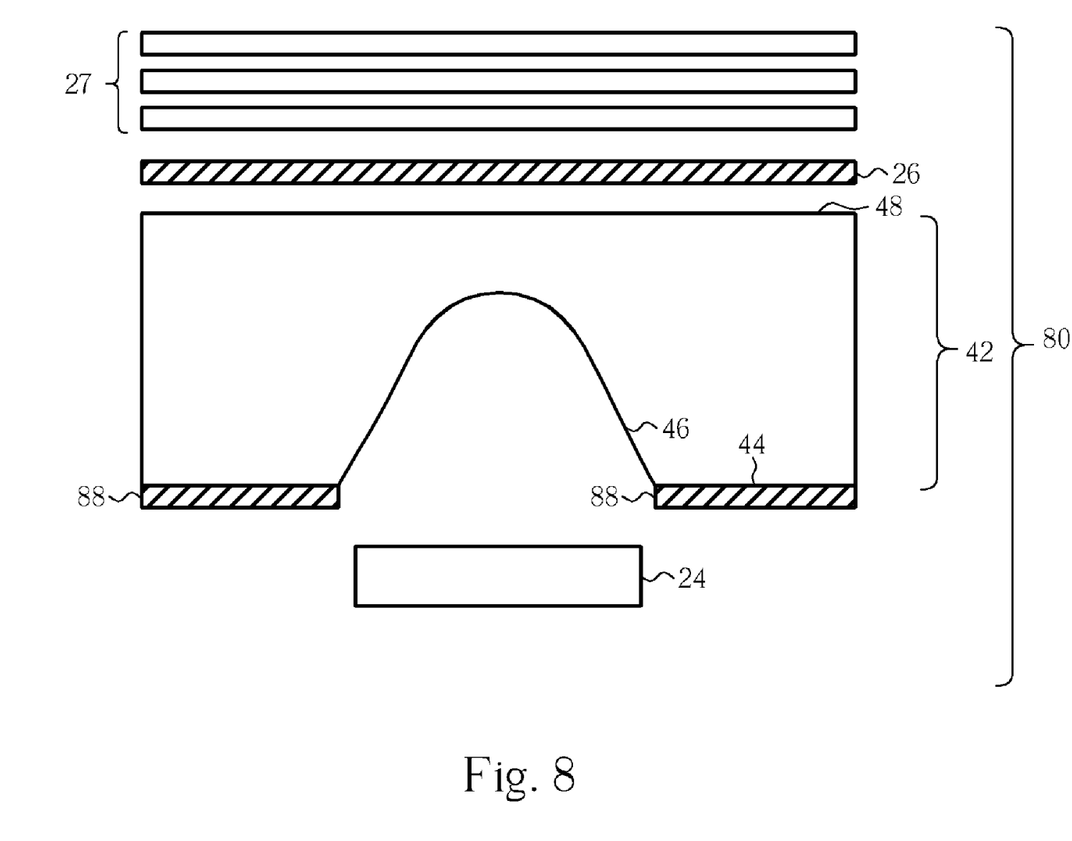
FIG. 8 is a diagram of another back light unit according to the present invention.

Please refer to FIG. 8. FIG. 8 is a diagram of another back light unit 80 according to the present invention. The back light unit 80 includes a plurality of LEDs 24 (only one LED 24 is shown in FIG. 8 as an example), a light guide panel 42, a diffuser sheet 26, and a plurality of optical films 27 that are completely the same elements as the plurality of LEDs 24, the light guide panel 42, the diffuser sheet 26, and the plurality of optical films 27 of the back light unit 40 in FIG. 4. The light guide panel 42 is an injection-molded slab that is pervious to light and comprises plastic and glass materials. The light guide panel 42 includes a light-exit surface 48 and an incident surface 44. The incident surface 44 includes a plurality of incident blocks 46(only one incident block 46 is shown in FIG. 8 as an example) arranged in a matrix manner correspondingly positioned beside the plurality of LEDs 24. The incident block 46 is a recess comprising a plurality of curves with different curvature radiuses (please refer to FIG. 5) for scattering light emitted from a corresponding LED 24. The back light unit 80 further includes a reflection film 88, which is constructed of a reflective material on the incident surface 44 of the light guide panel 42. Deserving to be mentioned, the reflection film 88 is only on a section of the incident surface 44 and not on other parts of the incident block 46.

Figure 9:
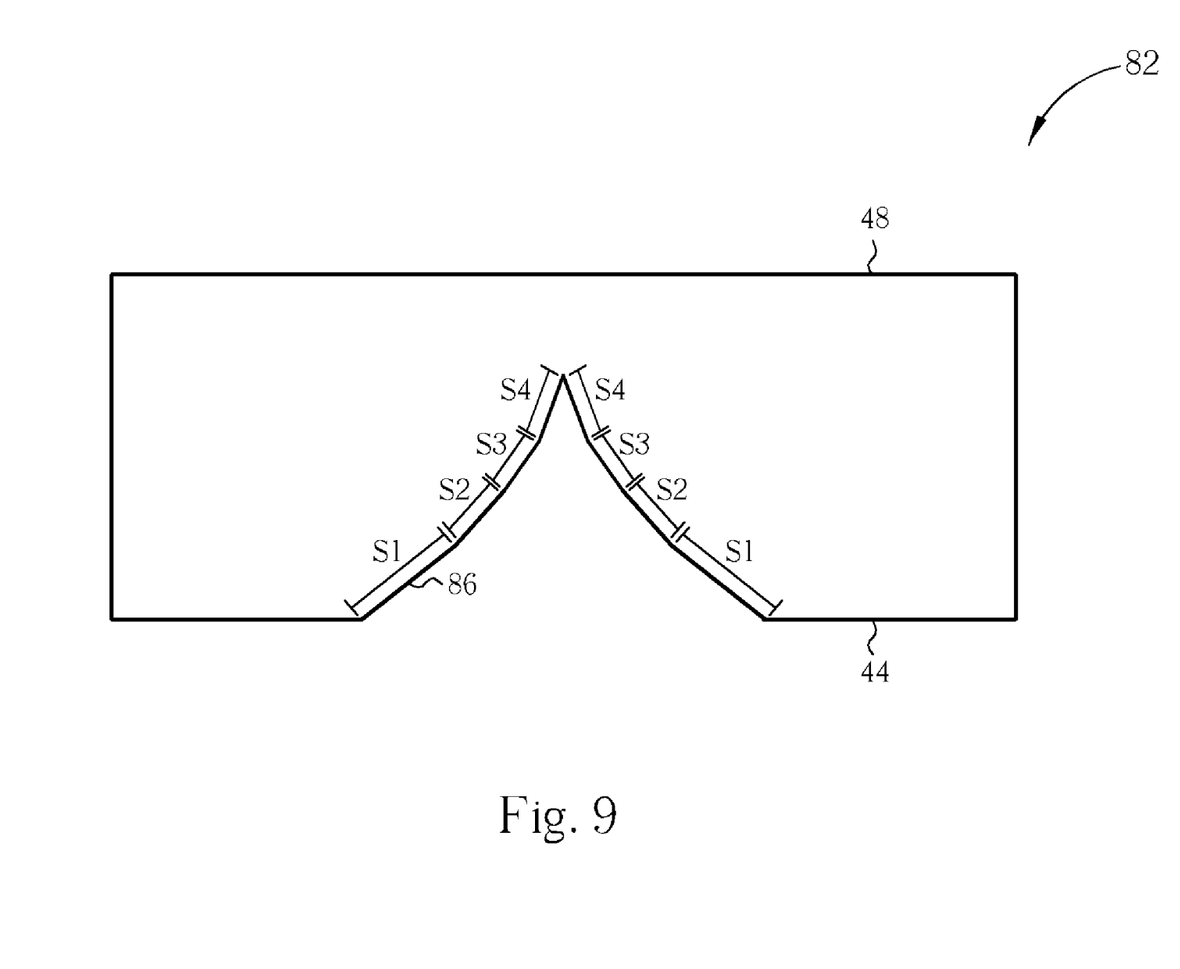
FIG. 9 is a diagram of another light guide panel according to the present invention.

Please refer to FIG. 9. FIG. 9 is a diagram of another light guide panel 82 according to the present invention. The light guide panel 82 includes a light-exit surface 48 and an incident surface 44. The incident surface 44 includes a plurality of incident blocks 86 (only one incident block 86 is shown in FIG. 9 as an example). Each incident block 86 includes a plurality of surfaces S1-S4 with different normal vectors. The slope of the surface S1 is smaller than the slope of the surface S2, the slope of the surface S2 is smaller than the slope of the surface S3, and the slope of the surface S3 is smaller than the slope of the surface S4. The incident angles of the surfaces S1-S4 are different due to the slopes of the surfaces S1-S4 being different. Therefore, the light guide panel 82 is capable of dispersing and mixing the light emitted from the LED 24.

Figure 10:
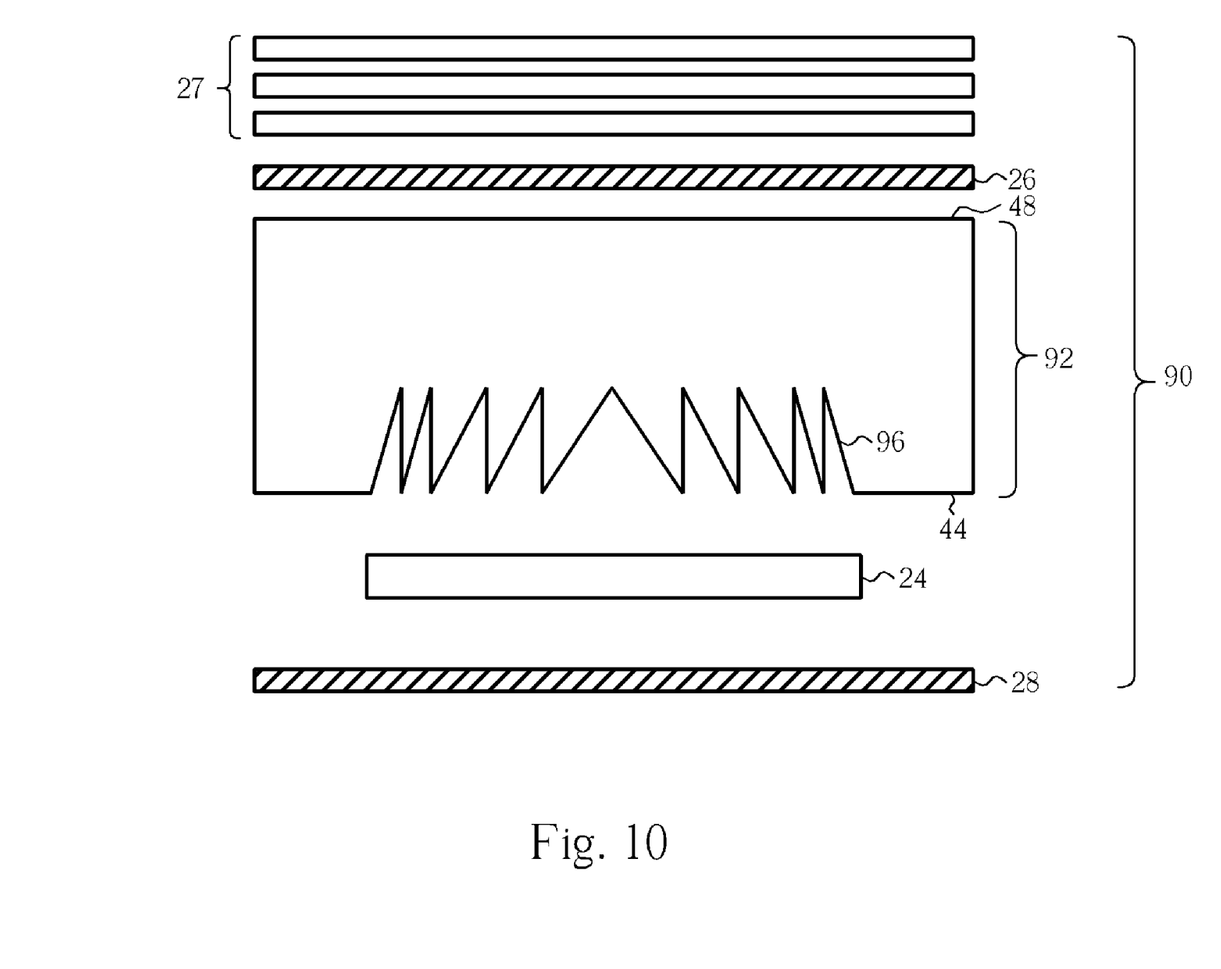
FIG. 10 is a diagram of another back light unit according to the present invention.

Please refer to FIG. 10, which is a diagram of another back light unit 90 according to the present invention. The light source of the back light unit 90 is from a plurality of LEDs 24 (only one LED 24 is shown in FIG. 10 as an example) positioned under a light guide panel 92. The plurality of LEDs 24 is used for generating light and the light guide panel 92 is used for mixing the light delivered from the plurality of LEDs 24. The light guide panel 92 is an injection-molded slab that is pervious to light and comprises plastic and glass materials. The light guide panel 92 includes a light-exit surface 48 and an incident surface 44. The incident surface 44 includes a plurality of incident blocks 96 (only one incident block 96 is shown in FIG. 10 as an example) arranged in a matrix manner correspondingly positioned beside of the plurality of LEDs 24. The incident block 96 includes a plurality of micro-prisms having different angles, and each micro-prism includes a surface having different normal vectors (please refer to FIG. 12). The back light unit 90 includes a diffuser sheet 26 with one side positioned at the light guide panel 92 and a reflection film 28 positioned at one side of the LED 24. The diffuser sheet 26 is used to diffuse light passing through the light guide panel 92 and the reflection film 28 is used to reflect light generated from the LED 24. The back light unit 90 further includes a plurality of optical films 27 positioned at another side of the diffuser sheet 26. The plurality of optical films 27 at least includes an optical film selected from a group consisting of a prism sheet, a diffuser plate, a brightness enhancement film, and a ¼-wavelength sheet. The quantities and the types of the plurality of optical films 27 depend on a user's demand or design.

Figure 11:
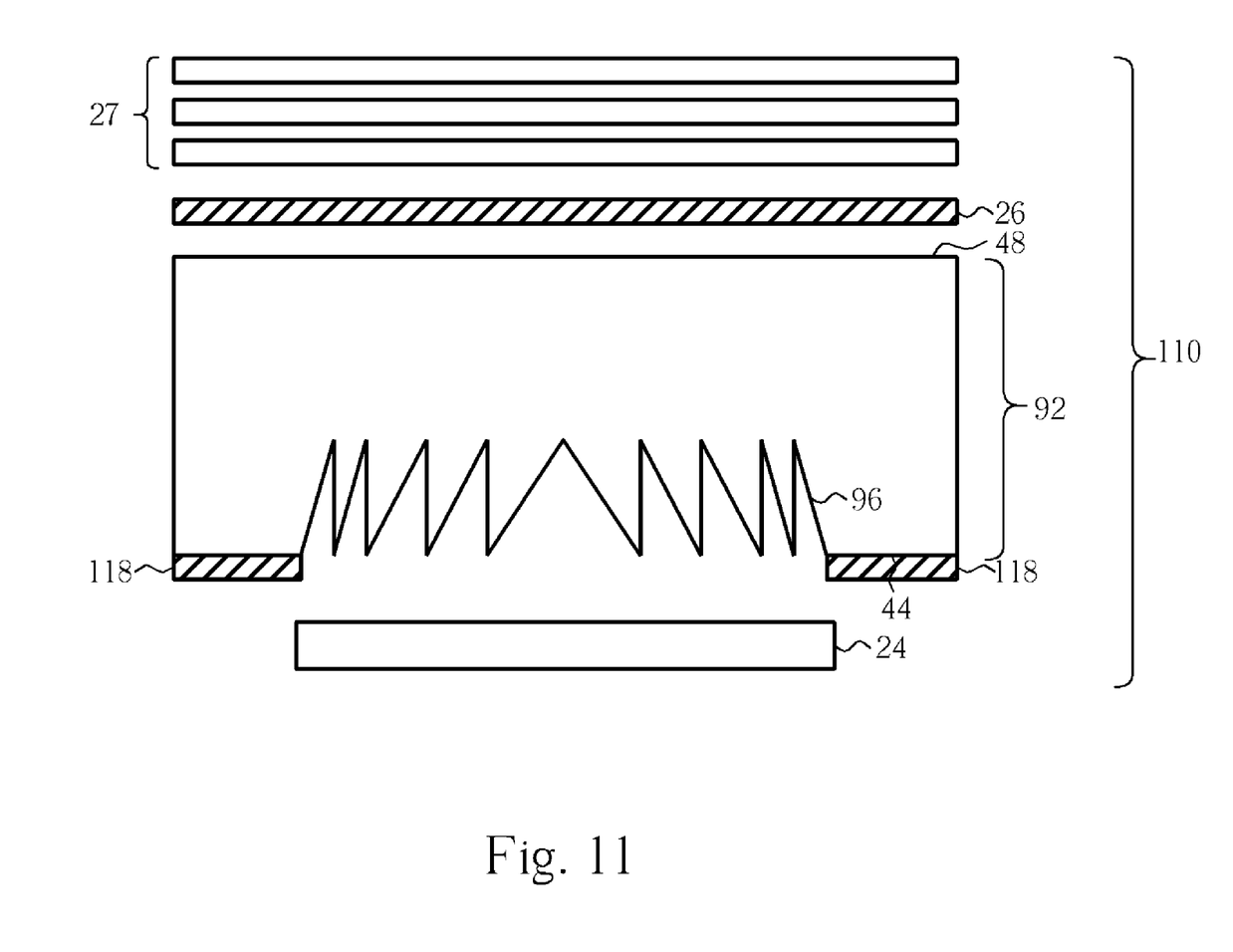
FIG. 11 is a diagram of another back light unit according to the present invention.

Please refer to FIG. 11 that is a diagram of another back light unit 110 according to the present invention. The back light unit 110 includes a plurality of LEDs 24 (only one LED 24 is shown in FIG. 11 as an example), a light guide panel 92, a diffuser sheet 26, and a plurality of optical films 27 and are completely the same elements as the plurality of LEDs 24, the light guide panel 92, the diffuser sheet 26, and the plurality of optical films 27 of the back light unit 90 in FIG. 10. The light guide panel 92 is an injection-molded slab that is pervious to light and comprises plastic and glass materials. The light guide panel 92 includes a light-exit surface 48 and an incident surface 44. The incident surface 44 includes a plurality of incident blocks 96 (only one incident block 96 is shown in FIG. 11 as an example) arranged in a matrix manner correspondingly positioned beside of the plurality of LEDs 24. The incident block 96 includes a plurality of micro-prisms having different angles, and each micro-prism includes a surface having different normal vectors (please refer to FIG. 12). The back light unit 110 further includes a reflection film 118, which is constructed of reflective material on the incident surface 44 of the light guide panel 92. Deserving to be mentioned, the reflection film 118 is only on a section of the incident surface 44 and not on other parts of the incident block 96.

Figure 12:
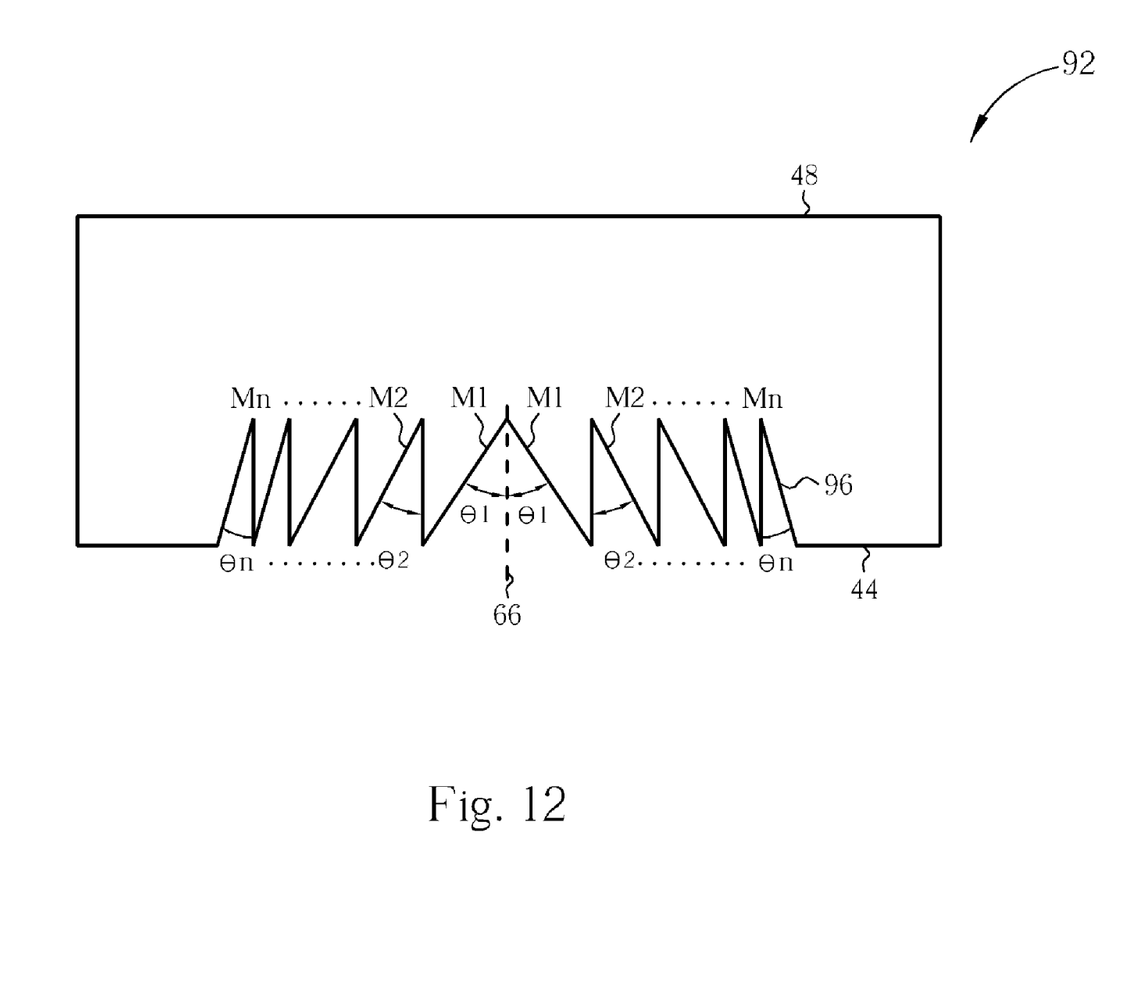
FIG. 12 is a diagram illustrating the light guide panel in FIG. 10.

Please refer to FIG. 12. FIG. 12 is a diagram illustrating the light guide panel 92 in FIG. 10. The light guide panel 92 includes a light-exit surface 48 and an incident surface 44. The incident surface 44 includes a plurality of incident blocks 96 (only one incident block 96 is shown in FIG. 12 as an example). Each incident block 96 comprises a plurality of micro-prisms having different angles, and the plurality of micro-prisms include the surfaces M1-Mn having different normal vectors. The included angles between the surfaces M1-Mn and the normal vector 66 are $\theta 1$-$\theta n$. The relationship between the included angles $\theta 1$-$\theta n$ is that $\theta 1$ is greater than $\theta 2$, $\theta 2$ is greater than $\theta 3$, and so on. The incident angles of the surfaces M1-Mn are different due to the included angles $\theta 1$-$\theta n$ being different.

Figure 13:
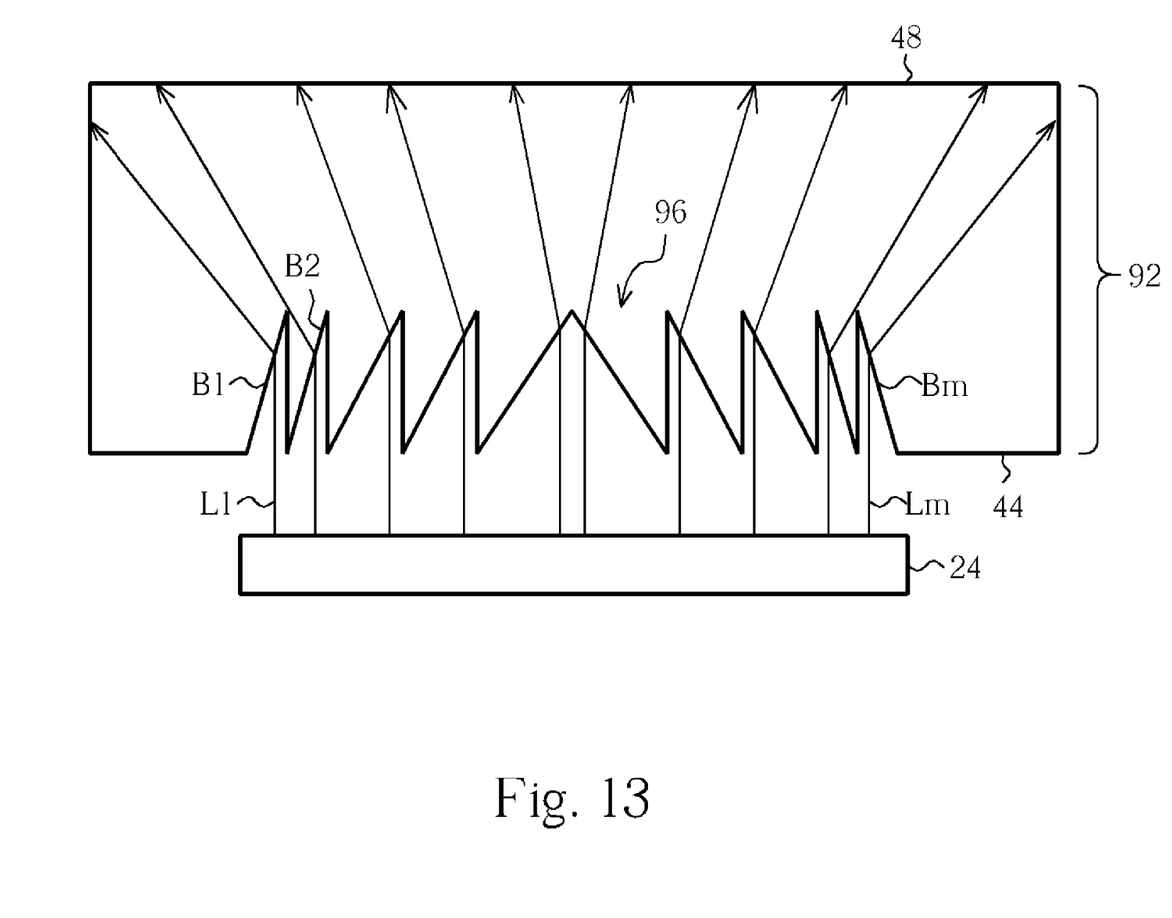
FIG. 13 is a diagram illustrating the moving path of light in the light guide panel of FIG. 10.

Please refer to FIG. 13. FIG. 13 is a diagram illustrating the moving path of light in the light guide panel 92 of FIG. 10. The light guide panel 92 includes a light-exit surface 48 and an incident surface 44. The incident surface 44 includes a plurality of incident blocks 96(only one incident block 96 is shown in FIG. 13 as an example). Each incident block 96 comprises a plurality of micro-prisms having different angles, and the plurality of micro-prisms include the surfaces B1-Bm having different normal vectors. The LED 24 radiates a plurality of rays L1-Lm into the incident block 96. The refraction angles of the rays L1-Lm are different due to the incident angles of the rays L1-Lm being different. Therefore, the light guide panel 92 is capable of dispersing and mixing the light emitted from the LED 24.

The above-mentioned embodiments illustrate but do not limit the present invention. When the incident block 46 comprises a plurality of curves R1-R4 with different curvature radiuses, the relationships between the curvature radiuses of the curves R1-R4 are not limited to R1>R2>R3>R4. Designing the curves R1-R4 with different curvature radiuses belongs to the present invention. When the incident block 86 consists of a plurality of surfaces S1-S4 with different normal vectors, the relationships between the slopes of the surfaces S1-S4 are not limited to S1<S2<S3<S4. Designing the surfaces S1-S4 with different slopes belongs to the present invention. In the same way, the relationships between the included angles $\theta 1$-$\theta n$ of the micro-prisms are not limited to $\theta 1 > \theta 2 > \ldots > \theta n$. Furthermore, the quantities of the surfaces of the incident block 46, 86, and 96 are not limited and depend on a users' demand.

In conclusion, the present invention provides a back light unit comprising a plurality of light emitting diodes and a light guide panel. The incident surface of the light guide panel includes a plurality of incident blocks arranged in a matrix manner correspondingly positioned beside the plurality of LEDs, and each incident block includes a plurality of surfaces with different normal vectors. Advantages of an LED are that it has long lifetime, small size, high color saturation, consumes low power, and causes no pollution. The light guide panel of the present invention enlarges the emitting area of the LED 24 and preserves the advantages of the LED.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A back light unit comprising:
   a plurality of light emitting diodes (LEDs) arranged in a matrix manner and used to generate light;
   a light guide panel comprising a light-exit surface and an incident surface, the incident surface comprising a plurality of incident blocks arranged in a matrix manner correspondingly positioned beside the plurality of LEDs, and each incident block comprising a recess extending away from a corresponding LED, the recess comprising a plurality of surfaces with different normal vectors and different slopes for scattering light emitted from the corresponding LED, an absolute value of the different slopes of the plurality of surfaces increasing as measured when moving from a periphery of the recess toward a center of the recess;
   a reflection film used to reflect light generated from the plurality of LEDs; and
   a diffuser sheet positioned at one side of the light-exit surface of the light guide panel and used to diffuse light passes through the light guide panel.

2. The back light unit of claim 1 wherein the light guide panel comprises plastic and glass materials.

3. The back light unit of claim 1 wherein the light guide panel is an injection molded slab that is pervious to light.

4. The back light unit of claim 1 wherein the center normal vector of each incident block is perpendicular to the light-exit surface of the light guide panel.

5. The back light unit of claim 1 wherein a diameter of the recess is approximately a diameter of an emitting surface of the corresponding LED.

6. The back light unit of claim 1 wherein each incident block comprises a plurality of micro-prisms having different angles.

7. The back light unit of claim 1 wherein the reflection film is positioned at another side of the plurality of LEDs.

8. The back light unit of claim 1 wherein the reflection film is constructed of reflection material smeared on the surface of the light guide panel structure.

9. The back light unit of claim 1 further comprising a plurality of optical films positioned on another side of the diffuser sheet.

* * * * *